United States Patent [19]
Kuroki

[11] Patent Number: 5,315,851
[45] Date of Patent: May 31, 1994

[54] STEERING LOCK DEVICE FOR VEHICLE

[76] Inventor: Shigenori Kuroki, 800-1, Minamikubo, Ohshima-cho, Miyazaki-shi, Miyazaki-ken, Japan

[21] Appl. No.: 794,434

[22] Filed: Nov. 19, 1991

[30] Foreign Application Priority Data

Nov. 20, 1990 [JP] Japan ............... 2-317067

[51] Int. Cl.⁵ ............................. B60R 25/02
[52] U.S. Cl. ........................ 70/252; 70/186
[58] Field of Search ................ 70/182-186, 70/252

[56] References Cited

U.S. PATENT DOCUMENTS

| | | | |
|---|---|---|---|
| 3,600,915 | 8/1971 | Corboud | 70/252 X |
| 3,613,412 | 10/1971 | Yamaguchi | 70/252 X |
| 3,650,131 | 3/1972 | Eichenauer | 70/252 |
| 3,673,879 | 7/1972 | Mizuno | 70/252 |
| 3,708,032 | 1/1973 | Suzuki | 70/252 X |
| 3,739,610 | 6/1973 | Kuroki | 70/252 |
| 3,782,145 | 1/1974 | Wolter | 70/252 X |
| 3,789,636 | 2/1974 | Nakashima | 70/252 |
| 3,859,828 | 1/1975 | Ibuka et al. | 70/252 |
| 3,914,967 | 10/1975 | Arman | 70/252 |
| 4,031,728 | 6/1977 | Eichenauer | 70/252 |
| 4,248,070 | 2/1981 | Eichenauer | 70/252 |
| 4,400,954 | 8/1983 | Nakamoto et al. | 70/252 X |
| 4,414,830 | 11/1983 | Maiocco | 70/252 |
| 4,425,770 | 1/1984 | Mentani et al. | 70/252 |
| 4,771,619 | 9/1988 | Shiramizu et al. | 70/252 X |

FOREIGN PATENT DOCUMENTS

| | | | |
|---|---|---|---|
| 335712 | 10/1989 | European Pat. Off. | 70/252 |
| 1913412 | 10/1970 | Fed. Rep. of Germany | 70/252 |
| 2824324 | 12/1979 | Fed. Rep. of Germany | 70/252 |
| 112849 | 7/1983 | Japan | 70/252 |
| 112850 | 7/1983 | Japan | 70/252 |
| 63-74360 | 5/1988 | Japan . | |
| 2018882 | 10/1979 | United Kingdom | 70/252 |

Primary Examiner—Peter M. Cuomo
Assistant Examiner—Suzanne L. Dino
Attorney, Agent, or Firm—Thomas R. Morrsion

[57] ABSTRACT

In a steering lock device used for a vehicle in which the locking member allows a steering shaft to rotate when an inner cylinder of a cylinder lock moves to ON position by the operation of a key, while the locking member locks the steering shaft when the key is withdrawn at a LOCK position, the steering lock device comprises a key lever disposed in the inner cylinder such that it can swing depending on the insertion and withdrawal of the key, an engaging portion disposed on the outer cylinder that engages the key lever when the inner cylinder is rotated from the ON position to the LOCK position by the key operation and a locking member disposed on the outer cylinder which retracts when the inner cylinder is positioned at the key withdrawal position, thereby unlocking the steering lock shaft, while protrudes when the key is withdrawn, thereby locking the steering shaft non rotatably.

8 Claims, 12 Drawing Sheets

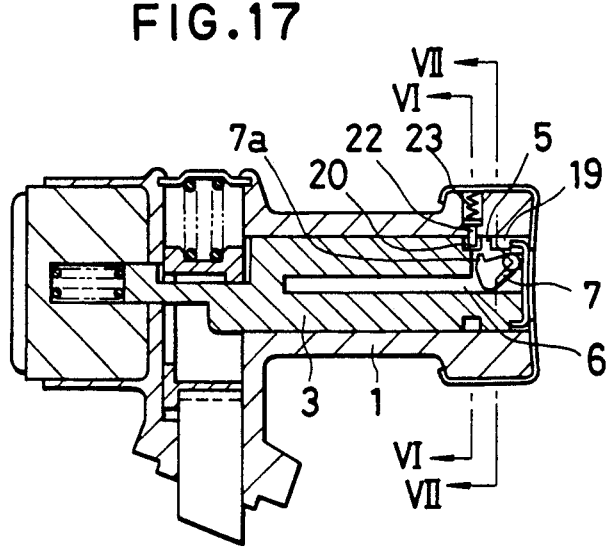
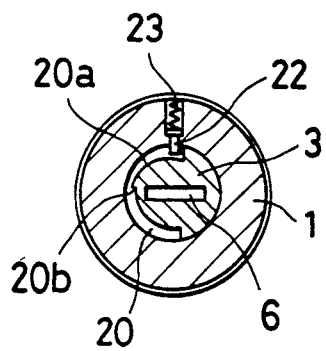
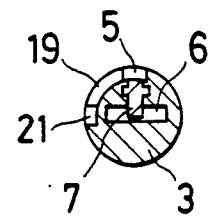
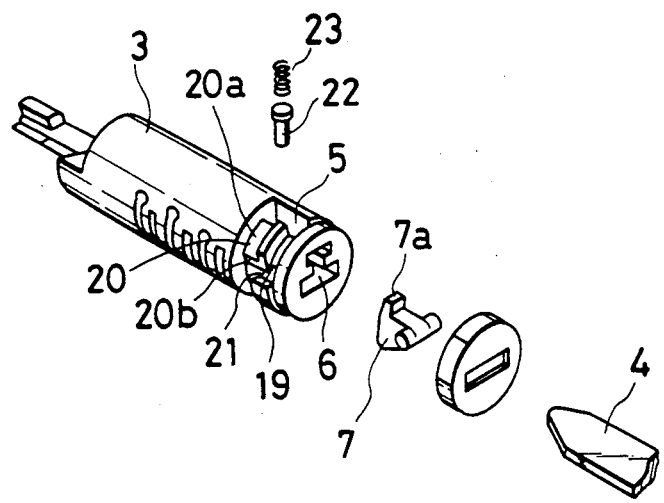

STEERING LOCK DEVICE FOR VEHICLE

BACKGROUND OF THE INVENTION

1. Field of the Invention

The present invention concerns a steering lock device used for a vehicle car in which a steering shaft of a vehicle steering handle is non-rotatably locked upon operation of an engine ignition key.

2. Description of the Prior Art

The steering lock device of the aforementioned type is adapted such that the steering shaft is kept unlocked, unless the key is withdrawn. The shaft remains unlocked even if a driver should erroneously or accidentally rotate a rotor of the cylinder lock device to a locking position during running of a car. This ensures safety during operation of the vehicle.

Heretofore, a steering lock device used for a vehicle having such a system has been disclosed in, for example, Japanese Patent Utility Model Laid Open Sho 63(1988)-74360 and it has the following constitution. That is, in order to hold a lock pin at an unlock position until withdrawal of a key, an engaging lever is movably disposed in a cylinder body that contains a rotor of a cylinder lock. The forward end of the lever is engaged with a slide member which is disposed slidably in the rotor of the cylinder lock for detecting the insertion of the key and radially and outwardly displacing to the rotor. The rear end of the lever is detachably engaged to another slider which is connected to a lock pin and slides in accordance with the rotation of the rotor. When the key is inserted into the rotor of the cylinder lock device, the top end of the engaging lever is raised by the slide member. The rear end of the engaging lever engages the slider to hold the lock pin at an unlock position. On the other hand, when the key is withdrawn from the rotor, the top end of the engaging lever retracts together with the slide member into the rotor. The rear end of the engaging lever detaches from the slider, thereby causing the lock pin to protrude out of the cylinder body under the force of a spring to lock the steering shaft in a non-rotatable position.

However, in the prior art system as described above, since the engaging lever is disposed on the cylinder body, there has been a problem that diametrical size of the cylinder body increases, thereby requiring an increased number of parts for mounting the engaging lever.

OBJECT OF THE INVENTION

An object of the present invention is to overcome the foregoing problems in the prior art and provide a steering lock device used for a vehicle, capable of simplifying the structure, decreasing the number of necessary parts and, thus, reducing the manufacturing cost.

SUMMARY OF THE INVENTION

The foregoing object of the present invention can be attained in a steering lock device used for a vehicle comprising an outer cylinder of a cylinder lock, an inner cylinder of the cylinder lock disposed in the outer cylinder such that it is pushed into the outer cylinder in the axial direction against the resiliency of a spring and is rotatable in the radial direction by an operation of a key, and a locking member holding a steering shaft selectively at a lock position and at an unlock position depending on the operation of the key. The locking member retracts into the outer cylinder thereby allowing the steering shaft to rotate when the inner cylinder is displaced axially and rotated radially to the direction of ON position by the insertion and rotation of the key, while the locking member protrudes from the outer cylinder thereby locking the steering shaft non-rotatably when the key is withdrawn at a LOCK position. The steering lock device comprises:

a key lever disposed swingably in the inner cylinder such that it can protrude out of and enter into the inner cylinder depending on the insertion and withdrawal of the key, an engaging portion disposed on the outer cylinder that engages the key lever when the inner cylinder is rotated from the ON position to the LOCK position by the operation applied to the key for holding the inner cylinder at a key withdrawal position axially displaced from a key insertion position, and a locking member disposed on the outer cylinder which situates at a retracted position in the outer cylinder, being in engagement with the inner cylinder when the inner cylinder is positioned at the key withdrawal position, thereby holding the steering lock shaft in an unlock state, while situates at a position protruding from the outer cylinder being disengaged from the inner cylinder by the entrance of the key lever into the inner cylinder under the resiliency of the spring when the key is withdrawn at the key withdrawal position to release the engagement between the key lever and the engaging portion and return the inner cylinder to the key insertion position, thereby locking the steering shaft non rotatably.

DESCRIPTION OF THE ACCOMPANYING DRAWINGS

These and other objects, as well as advantageous features of the present invention will become apparent by reading descriptions for preferred embodiments with reference to the accompanying drawings, wherein FIG. 1 is a longitudinal cross sectional view of a steering lock device used as a first embodiment according to the present invention;

FIG. 5(a)-FIG. 5(d) are sectional views illustrating steps in the operation of the steering lock device.

FIG. 6(a)-FIG. 6(d) are sectional views illustrating steps in the operation of the steering lock device.

Figure 7A:
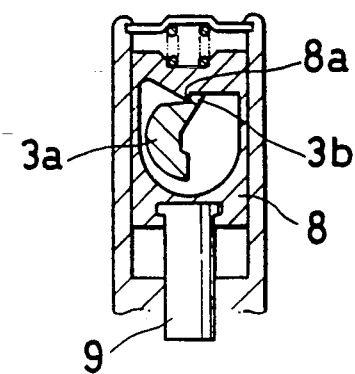
Figure 7B:
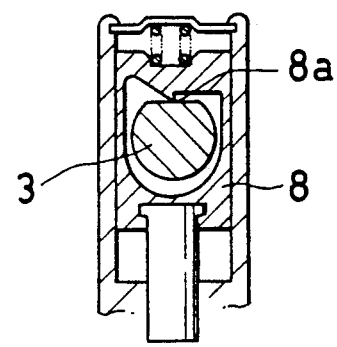
Figure 7C:
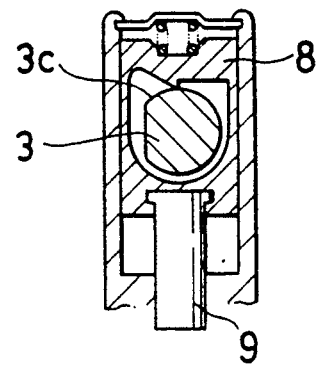

FIG. 7(a)-FIG. 7(c) are sectional views illustrating steps in the operation of the steering lock device.

Figure 8:
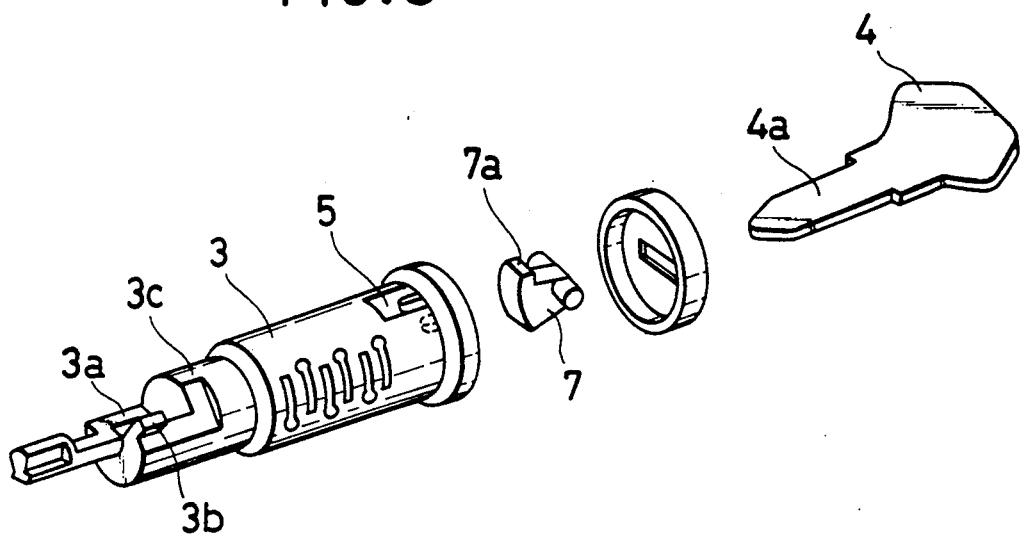
Figure 9:
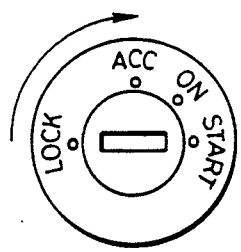
Figure 10:
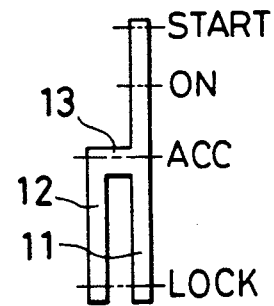
Figure 11:
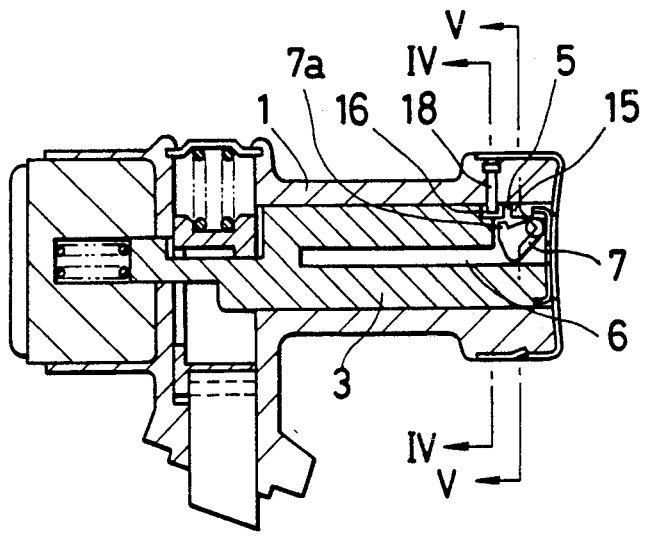
Figure 12:
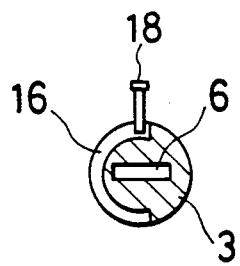
Figure 14:
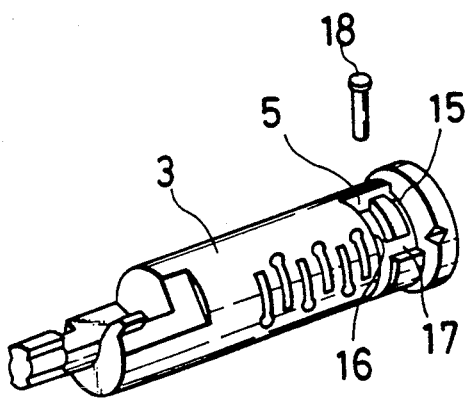
Figure 13:
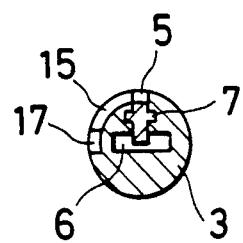

FIG. 8 is an exploded perspective view of a rotor;

FIG. 9 is a front elevational view of a cylinder lock;

FIG. 10 is a conceptional view of a guide groove;

FIG. 11 is a longitudinal cross sectional view of a steering lock device as a second embodiment according to the present invention;

FIG. 12 is a cross sectional view taken along lines IV—IV shown in FIG. 11;

FIG. 13 is a cross sectional view taken along lines V—V of FIG. 11;

FIG. 14 is a perspective view of a rotor;

FIG. 15(a)-FIG. 15(d) are sectional views illustrating steps in the operation of the steering lock device.

Figure 16A:
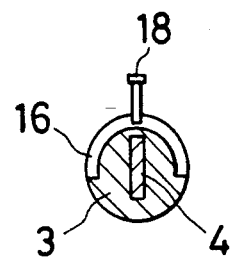
Figure 16B:
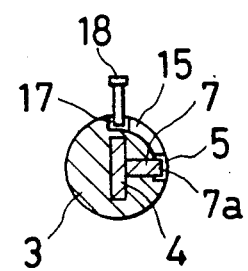
Figure 16C:
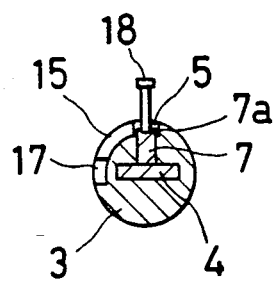

FIG. 16(a)–FIG. 16(c) are sectional views illustrating steps in the operation of the steering lock device.

FIG. 17 is a longitudinal cross sectional view of a steering lock device as a third embodiment according to the present invention;

FIG. 18 is a cross sectional view taken along lines VI—VI shown in FIG. 17;

FIG. 19 is a cross sectional view taken along lines VII—VII of FIG. 17;

FIG. 20 is an exploded perspective view of a rotor;

FIG. 21(a)–FIG. 21(d) are sectional views illustrating steps in the operation of the steering lock device.

Figure 22A:
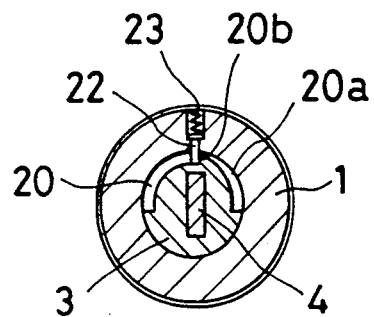
Figure 22B:
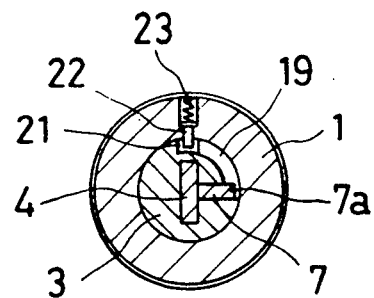
Figure 22C:
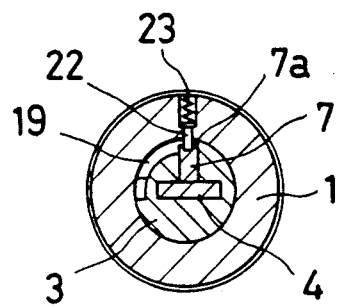

FIG. 22(a)–FIG. 22(c) are sectional views illustrating steps in the operation of the steering lock device.

Figure 23:
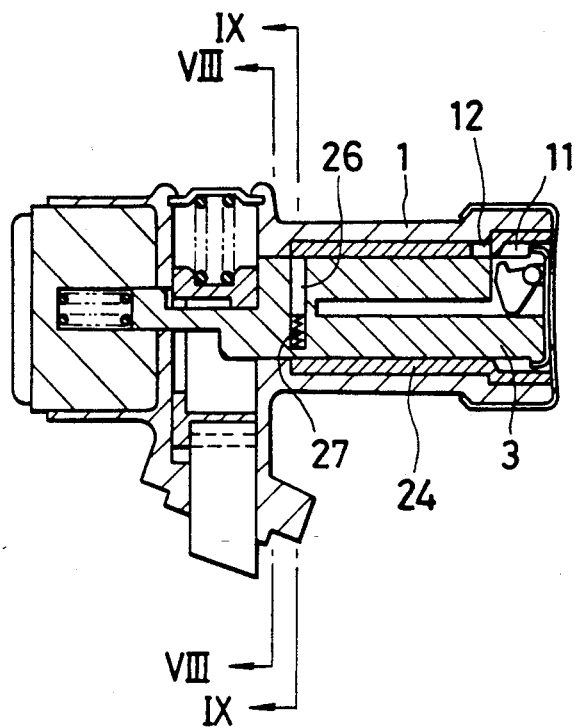
Figure 24:
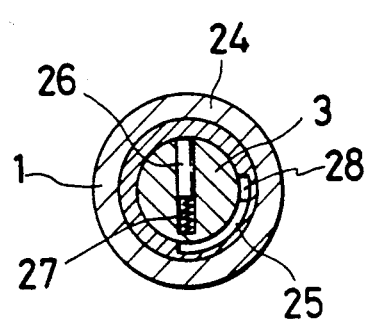
Figure 25:
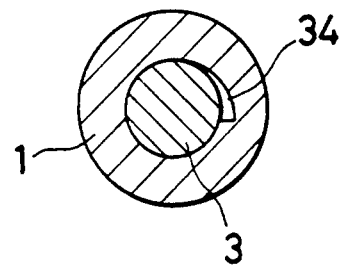
Figure 26:
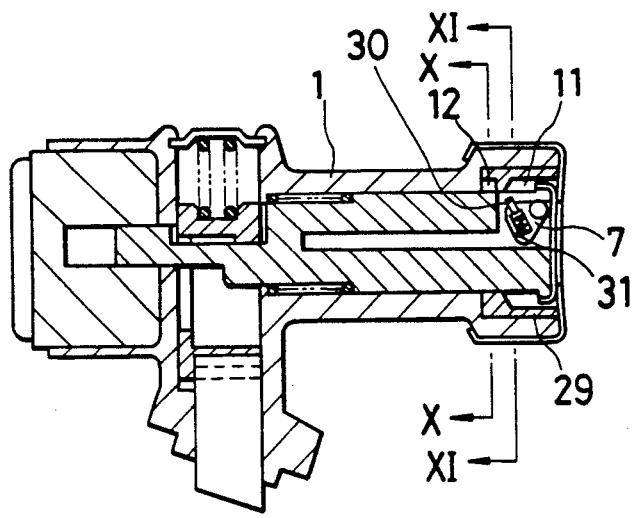
Figure 27:
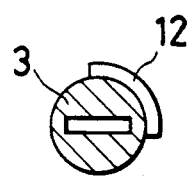
Figure 28:
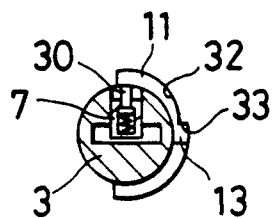

FIG. 23 is a longitudinal cross sectional view of a vehicle steering lock device according to the present invention;

FIG. 24 is a cross sectional view taken along lines IX—IX shown in FIG. 23;

FIG. 25 is a cross sectional view taken along lines VIII—VIII of FIG. 23;

FIG. 26 is a longitudinal cross sectional view of a steering lock device as a fifth embodiment according to the present invention;

FIG. 27 is a cross sectional view taken along lines X—X shown in FIG. 26;

FIG. 28 is a cross sectional view taken along lines XI—XI shown in FIG. 26; and

Figure 29:
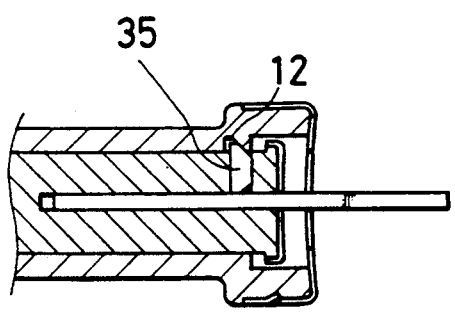

FIG. 29 is a longitudinal cross sectional view illustrating a modification of a key lever in the steering lock device.

DESCRIPTION OF THE PREFERRED EMBODIMENTS OF THE INVENTION

The present invention will now be described by way of its preferred embodiments with reference to the drawings.

First Embodiment

Figure 1:
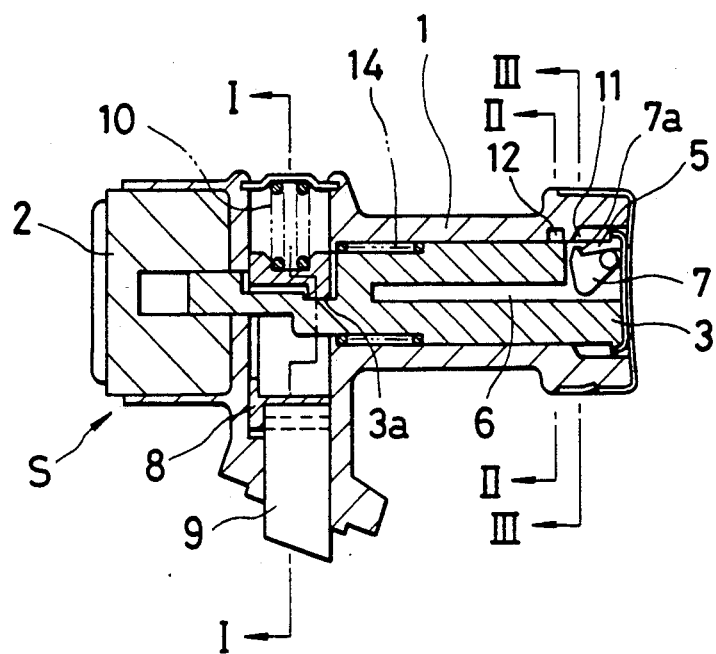
Figure 2:
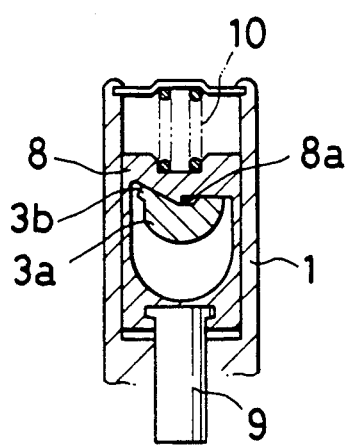
FIG. 2 is a cross sectional view taken along lines I—I of FIG. 1.
Figure 3:
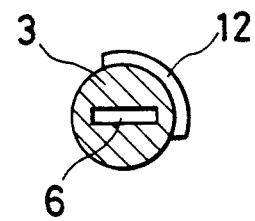
FIG. 3 is a cross sectional view taken along lines II—II of FIG. 1.
Figure 4:
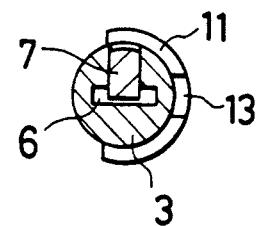
FIG. 4 is a cross sectional view taken along lines III—III of FIG. 1.

FIG. 1 is a vertical cross sectional view of a steering lock device as a first embodiment according to the present invention. FIG. 2 is a cross sectional view taken along lines I—I of FIG. 1. FIG. 3 is a cross sectional view taken along lines II—II of FIG. 1. FIG. 4 is a cross sectional view taken along lines III—III of FIG. 1. FIGS. 5(a)–(d) through FIGS. 7(a)–(c) are views for illustrating the operation of the steering lock device. FIG. 8 is an exploded perspective view of a rotor. FIG. 9 is a front elevational view of a cylinder lock. FIG. 10 is a conceptional view of a guide groove.

As shown in FIG. 1, a main body (outer cylinder) 1 of a steering lock device has an ignition switch 2 disposed in the rear part, and a rotor (inner cylinder) 3 of the steering cylinder lock device disposed in the front part thereof, respectively. The ignition switch 2 actuates when the rotor 3 is rotated by the operation made to a key 4 (refer to FIG. 5).

The rotor 3 is biased resiliently forward by a spring 14. In the rotor 3, the key insertion portion and the switch actuation portion are formed as an integral structure, but they may be constituted divisionally.

As shown in FIGS. 1 and 4, a key lever 7 is pivotally disposed at a key insertion hole 6 on the front end of the rotor 3 (also refer to FIG. 8). A hole 5 is formed through the outer circumferential surface of the rotor 3 for allowing an engaging protrusion 7a of the key lever 7 to protrude, as key lever 7 swings in accordance with the insertion and withdrawal of the key 4, the engaging protrusion 7a inserts and retracts from the recess 5.

Further, two circumferential guide grooves 11 and 12 are formed along an inner periphery of the front end of the main body 1. The guide grooves 11 and 12 are in communication with each other by means of an axial communication groove 13 at an ACC position for the rotation of the rotor 3 (refer to FIG. 10), so that the engaging protrusion 7a of the key lever 7 is moved along the guide grooves 11 and 12 and the communication groove 13 when the rotor 3 displaces in the circumferential direction and then in the axial direction.

As shown in FIGS. 1 and 2, a slider 8 is housed vertically slidably in the rear part of the main body 1. The lower end of the slider 8 is coupled with a lock pin 9, so that the lock pin 9 can be engaged to, and disengaged from, a steering shaft (not illustrated) depending on the vertical sliding movement of the slider 8. The slider 8 is biased by a spring 10 to protrude the lock pin 9 from the main body 1.

A semi-circular cam 3a is formed to the rear part of the rotor 3. The semi-circular cam 3a is engaged with the slider 8, so that the slider 8 moves slidably in the vertical direction by the rotation of the rotor 3 (refer to FIG. 9), to release the engagement between the lock pin 9 and the steering shaft.

Referring now to FIG. 7(a), semi-circular cam 3a has a protrusion 3b capable of engaging with an engaging surface 8a of the slider 8 at the ACC position. In this position, rotor 3 is prevented from rotating from the ACC position to the LOCK position. Engagement can only be released by engaging a pushing operation which allows rotor 3 to rotate from the ACC position to the LOCK position.

Description will be made to the operation of this embodiment.

When the key 4 is inserted into the key insertion hole 6 at the LOCK position shown in FIG. 1 through FIG. 4, the flat surface 4a of the key 4 (refer to FIG. 8) pivotally raises the key lever 7. Engaging protrusion 7a of the key lever 7 enters the guide groove 11 (FIG. 5(a), FIG. 7(a)).

Figure 5A:
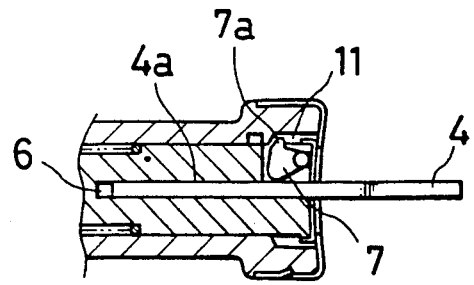
Figure 5B:
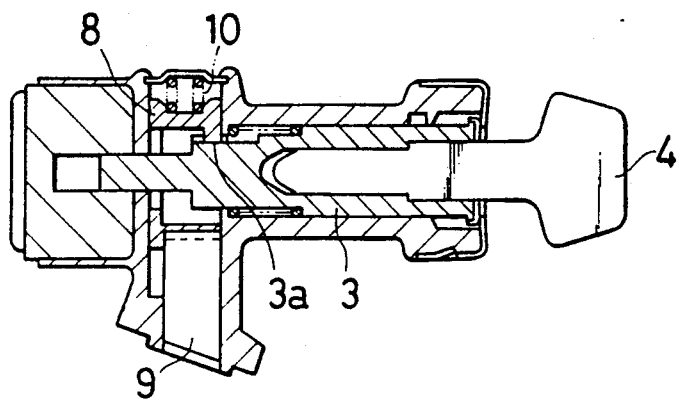
Figure 5C:
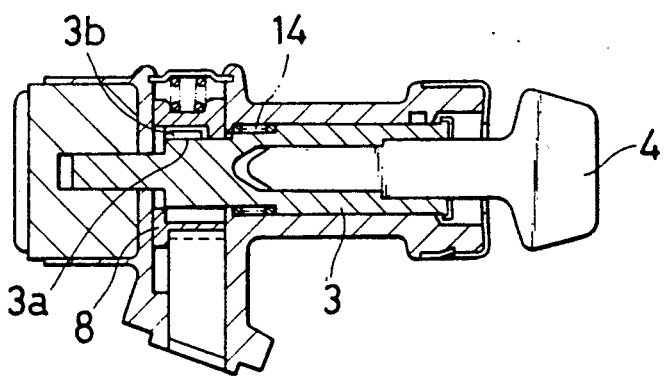
Figure 5D:
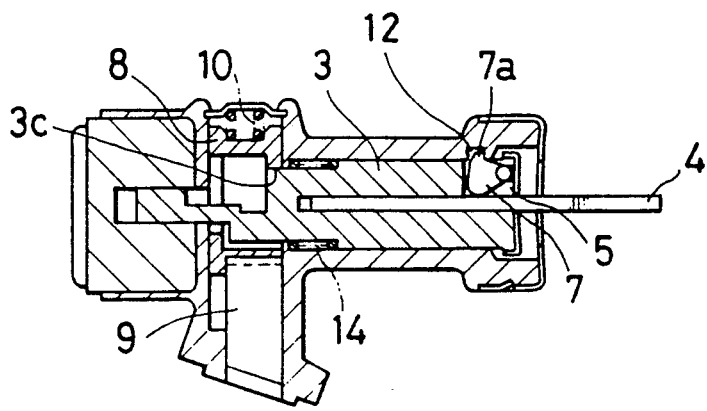
Figure 6A:
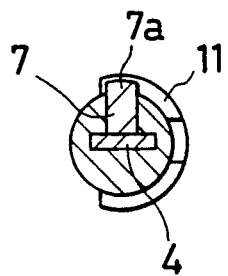
Figure 6B:
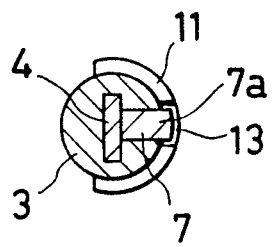
Figure 6C:
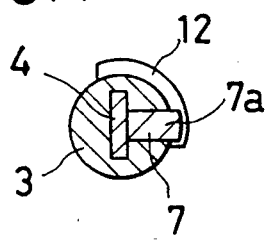
Figure 6D:
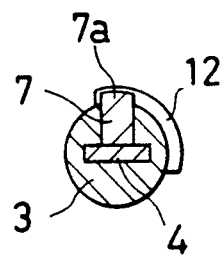

When the rotor 3 is rotated from the LOCK position to the ACC position by the operation made to the key 4 in the direction of an arrow shown in FIG. 9, the semi-circular cam 3a of the rotor 3 causes the slider 8 to move slidably in the upward direction (FIG. 5(b), FIG. 6(b)). By the upward sliding of the slider 8, engagement between the lock pin connected to the slider 8 and the steering shaft is released.

Since the protrusion 3b formed on the semi-circular cam 3a engages the engaging surface 8a of the slider 8 at the ACC position (FIG. 7(a)), the rotor 3 can not be returned to the LOCK position. Then, by applying pressure to key 4, rotor 3 is pushed rearward into main body 1. Rotor 3 moves against the force of spring 14, allowing protrusion 3b of the semi-circular cam 3a to disengage the engaging surface 8a of the slider 8, thereby engaging the rotor 3 into a position from which it can rotate to the LOCK position (FIG. 5(c), FIG. 7(b)).

Further, when key 4 is pushed rearward at the ACC position, the engaging protrusion 7a of the key lever 7 in the guide groove 11 moves through the communication groove 13 into the guide groove 12 (FIG. 6(b), (c)).

Then, when the rotor 3 is rotated from the ACC position to the LOCK position, the engaging protrusion 7a of the key lever 7 engages the guide groove 12. Thus, rotor 3 is prevented from moving forward (FIG. 5(d), FIG. 6(d)). In this state, the slider 8 engages an outer periphery 3c of the rotor 3 (refer to FIG. 8) and holds the lock pin 9 in an unlock position (FIG. 5(d), FIG. 7(c)).

When the key 4 is removed from the key insertion hole 6, the key lever 7 pivots under the force of the spring 14, and retracts into the rotor 3. Once engaging protrusion 7a of the key lever 7 disengages guide groove 12 rotor 3 returns to its forward position. Outer periphery 3c of the rotor 3 disengages slider 8, which is biased downward by the spring 10. Lock pin 9, which is coupled with the slider 8, is returned to a locking position where it locks the steering shaft (FIGS. 1 and 2).

Second Embodiment

FIG. 11 is a longitudinal cross sectional view of a steering lock device as a second embodiment according to the present invention, FIG. 12 is a cross sectional view taken along lines IV—IV shown in FIG. 11. FIG. 13 is a cross sectional view taken along lines V—V of FIG. 11. FIG. 14 is an exploded perspective view of a rotor; and FIGS. 15(a)-(d) and FIGS. 16(a)-(c) are views for illustrating the operation of the steering lock device.

As shown in FIG. 11 through FIG. 14, a rotor 3 has two circumferential guide grooves 15 and 16 formed in the forward end along an outer periphery contiguous with a hole 5. The guide grooves 15 and 16 are in communication with each other by way of an axial communication groove 17 at an ACC position for the rotation of the rotor 3.

Further, a control pin 18 is attached to the forward end of a main body 1 passing through the circumferential groove from the outside to the inside. The top end of the control pin 18 is adapted to move along the recess 5, the guide grooves 15 and 16 and the communication groove 17 upon displacing the rotor 3 in the circumferential direction and the axial direction. The top end of the control pin 18 situates in the recess 5 at the LOCK position. Other constitutions are the same as those in the first embodiment.

Description will now be made to the operation of this embodiment.

Figure 15A:
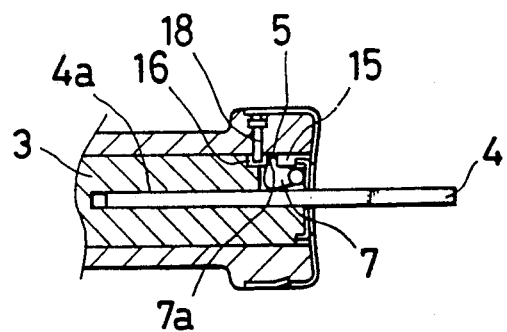

When the key 4 is inserted into the key insertion hole 6 at the LOCK position shown in FIG. 11 through FIG. 13, the flat surface 4a of the key 4 pivotally raises the key lever 7, so that the engaging protrusion 7a of the key lever 7 protrudes through the recess 5 (FIG. 15(a)).

Figure 15B:
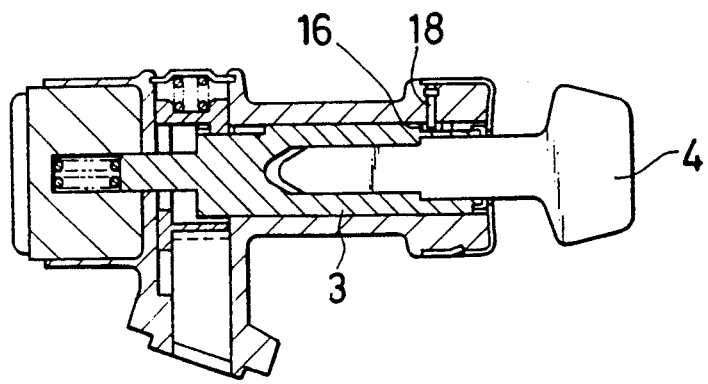
Figure 15C:
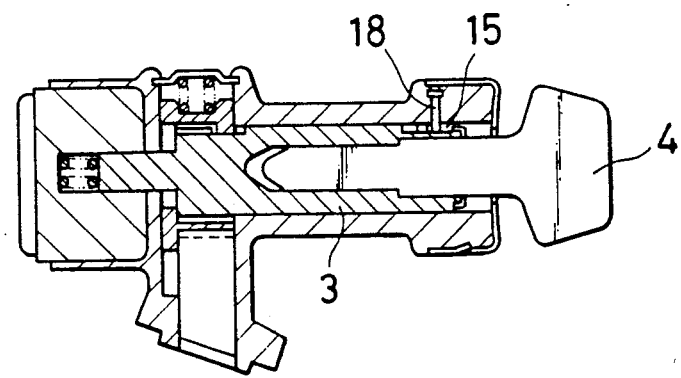
Figure 15D:
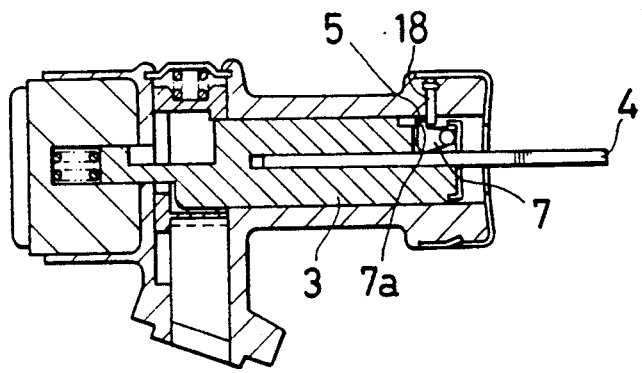

When the rotor 3 is rotated from the LOCK position to the ACC position by turning key 4 and returned to the LOCK position by the pushing operation (FIGS. 15(b), (c), (d), FIGS. 16(a), (b), (c)), the top end of the control pin 18 moves by way of the communication groove 17 to the recess 5. Pin 18 is placed behind the key lever 7 engages the engaging protrusion 7a (FIG. 15(d), FIG. 16(c)). In this state the rotor 3 is inhibited from moving forward. Other operations are the same as those in the first embodiment.

Third Embodiment

FIG. 17 is a longitudinal cross sectional view of a steering lock device as a third embodiment according to the present invention, FIG. 18 is a cross sectional view taken along lines VI—VI shown in FIG. 17. FIG. 19 is a cross sectional view taken along lines VII—VII shown in of FIG. 17. FIG. 20 is exploded perspective view of a rotor FIGS. 21 and 22 are views for illustrating the operation of the steering lock device.

As shown in FIG. 17 through FIG. 20, two circumferential guide grooves 19 and 20 are formed in at the forward end along the outer circumferential surface contiguous with a recess 5 of a rotor 3. Guide grooves 19 and 20 are in communication with each other by way of an axial communication groove 21 at an ACC position for the rotation of the rotor 3.

A control pin 22 is attached in the forward end of the main body 1. Control pin 22 is resiliently biased by a spring 23 in the direction of protruding into the guide grooves 19 and 20 and the communication groove 21. The top end of the control pin 22 is so adapted that it moves along the guide grooves 19 and 20 and the communication groove 21 upon displacing the rotor 3 in the circumferential direction and the axial direction.

In this embodiment, the guide groove 20 has a cam face 20a for retracting the control pin 22 into the main body 1 upon rotating the rotor 3 from the LOCK position to the ACC position, and an engaging face 20b for inhibiting the rotor 3 at the ACC position from rotating to the LOCK position, so that the rotor 3 can not rotate at the ACC position to the LOCK position unless the pushing operation is applied thereto.

At the LOCK position, the top end of the control pin 22 is situated in the recess 5. Other constitutions are the same as those in the first embodiment.

Description will be made to the operation of this embodiment.

Figure 21A:
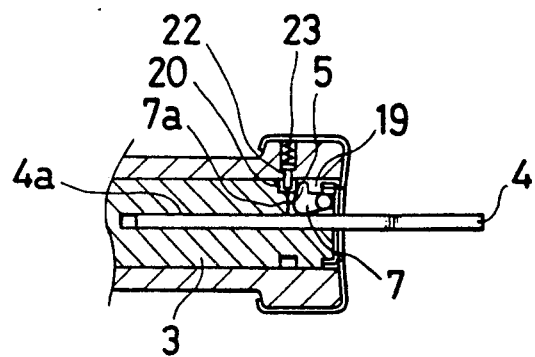
Figure 21B:
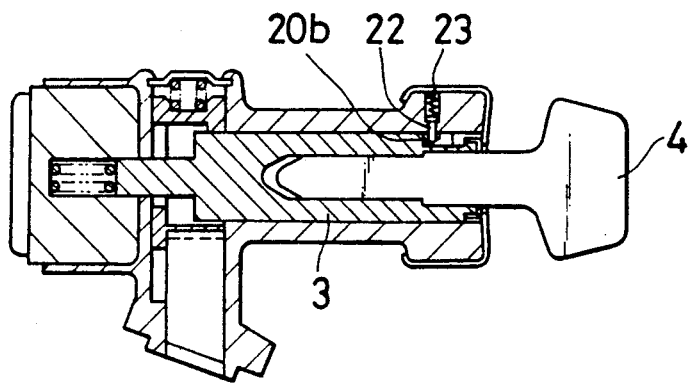
Figure 21C:
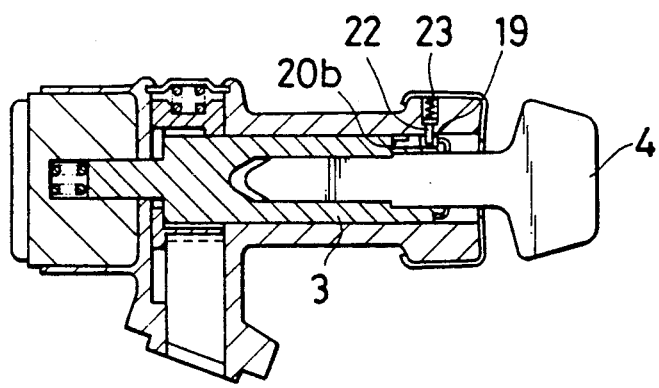
Figure 21D:
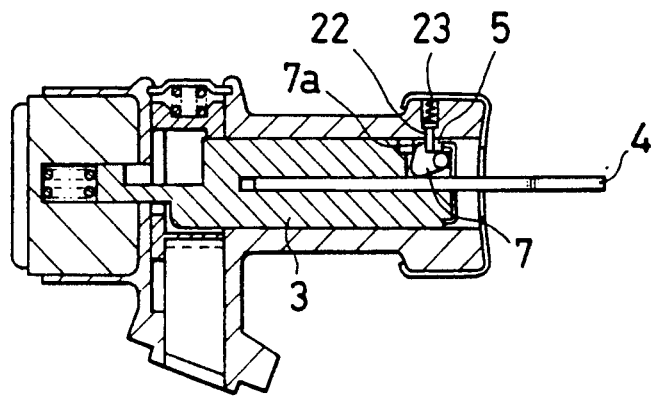

When the key 4 is inserted into the key insertion hole 6 at the LOCK position shown in FIG. 17 through FIG. 19, the flat surface 4a of the key 4 engages the key lever 7, so that the engaging protrusion 7a of the key lever 7 protrudes through the recess 5 (FIG. 21(a)). Then, when the rotor 3 is rotated from the LOCK position to the ACC position by the operation made to the key 4 and then the rotor 3 is again returned to the LOCK position by the pushing operation applied thereto (FIGS. 21(b), (c), (d), FIGS. 22(a), (b), (c)), since the top end of the control pin 22 moves by way of the communication groove 21 to the recess 5 and is situated ahead of the key lever in a state engaging the engaging protrusion 7a of key lever 7 (FIG. 21(d), FIG. 22(c)), the rotor 3 is inhibited from moving forward. Other operations are the same as those in the first embodiment. Fourth Embodiment FIG. 23 is a longitudinal cross sectional view of a steering lock device as a fourth embodiment according to the present invention, FIG. 24 is a cross sectional view taken along lines IX—IX shown in FIG. 23, and FIG. 25 is a cross sectional view taken along lines VIII—VIII in FIG. 23, As shown in FIG. 23 through FIG. 25, a main body 1 of a steering lock device has a cylinder lock comprising a cylinder body 24 and a rotor 3 disposed in the forward part thereof.

Control grooves comprising guide grooves 11 and 12 and a communication groove (not illustrated) are formed in the front end along the inner circumferential surface of the cylinder body 24 in the same was as in the first embodiment described previously. Further, a guide groove 25 is formed along the inner circumferential surface in the rear end of the cylinder body 24 extending over the ACC position to the START position for the rotation of the rotor 3.

A control pin 26 is incorporated to the rotor 3 in a state being resiliently biased by a spring 27 in the protruding direction. It is adapted such that when the rotor 3 is rotated from the LOCK position to the ACC position, the control pin 26 protrudes into the guide groove 25 to inhibit rotation of the rotor 3 from the ACC position to the lock position. Further, a guide groove 34 is formed at a position behind the guide groove 25. The guide groove 34 is disposed over a range from the ACC position to the LOCK position for the rotation of the rotor 3, so that the control pin 26 can retract into the rotor when the rotor 3 is rotated from the ACC position to the LOCk position. The guide grooves 25 and 34 are in communication with each other by way of an axial communication groove 28 at the ACC position by the rotation of the rotor 3. This enables rotor 3 to rotate to the LOCK position by applying the pushing operation to the rotor 3 at the ACC position. Other constitutions and operations are the same as those in the first embodiment.

Fifth Embodiment

FIG. 26 is a longitudinal cross sectional view of a steering lock device for a fifth embodiment according to the present invention, FIG. 27 is a cross sectional view taken along lines X—X shown in FIG. 26, FIG. 28 is a cross sectional view taken along lines XI—XI shown in FIG. 26.

As shown in FIG. 26 through FIG. 28, a main body 1 of a steering lock device has a collar 29 mounted to the inside at the forward end thereof, and control grooves comprising the guide grooves 11 and 12 and a communication groove 13 are formed on the inner circumferential surface of the collar 29 like those formed to the body 1 in the first embodiment.

An engaging pin 30 is incorporated at the top end of a key lever 7 in a state resiliently biased by a spring 31 in the protruding direction instead of the engaging protrusion 7a in the first embodiment. The guide groove 11 has a cam face 32 for retracting the engaging pin 30 into the key lever 7 upon rotating the rotor 3 from the LOCK position to the ACC position, and an engaging face 33 for engaging the engaging pin 30 at the ACC position thereby inhibiting the rotor 3 from rotating to the LOCK position, so that the rotor 3 can not to rotate at the ACC position to the LOCK position unless the pushing operation is applied thereto. Other constitutions and operations are the same as those in the first embodiment.

In each of the foregoing embodiments, a swingable type key lever has been shown but it may be also constituted as a vertical sliding structure, for example, as shown in FIG. 29. In this case, engaging portions of a key lever 35 and a guide groove 12 are inclined to each other toward the forward direction, so that smooth sliding operation can be attained.

Further, each of the embodiments described above, is adapted to allow the rotation of the rotor from the ACC position to the LOCK position by the pushing operation to the rotor 3, but it may be also constituted such that the rotation from the ACC position to the LOCK position is allowed by the pulling operation made to the rotor 3.

Since the present invention has been constituted as described above, the mechanism for keeping the steering shaft unlocked unless the key is withdrawn can be attained, only by means of the key lever contained in the inner cylinder of the cylinder lock and, as a result, the number of parts can be decreased and the size of the main body can be reduced. Accordingly, it is capable in providing an inexpensive steering lock device used for vehicles.

What is claimed is:

1. A steering lock device for locking a steering shaft of a vehicle comprising:
    an outer cylinder;
    an inner cylinder rotatably mounted in said outer cylinder;
    a keyhole in said inner cylinder;
    means for permitting rotation of said inner cylinder between first and second rotation positions in response to insertion and actuation of a key;
    means for permitting axial movement of said inner cylinder between first and second axial positions;
    means for resiliently urging said inner cylinder to said first axial position;
    a lock member in said outer cylinder;
    said lock member including a slider linked with said inner cylinder and a lock pin connected to said slider;
    said lock member having lock and release operating positions to lock and unlock said steering shaft, respectively;
    means for urging said lock member to said release position in response to said inner cylinder being in said second rotation position;
    a regulating member to prevent said inner cylinder from moving directly from said second rotation position to said first rotation position unless said inner cylinder is urged into said second axial position after said inner cylinder has moved to said second rotation position;
    a block member provided to said inner cylinder;
    said block member including means for keeping said lock member in said release position when said inner cylinder moves from said first axial position to said second axial position and rotates from said second rotation position to said first rotation position; and
    an engaging member disposed in said inner cylinder;
    said engaging member including a key lever, said key lever having an engaging protrusion in a top end thereof;
    said key lever swingably pivoted in said inner cylinder;
    said engaging protrusion of said key lever protruding out of said inner cylinder and engaging an engaging portion in said outer cylinder to hold said inner cylinder at said second axial position when said key is present in said keyhole; and
    said engaging protrusion of said key lever moving into said inner cylinder and disengaging said engaging protrusion from said engaging portion in said outer cylinder, to allow said inner cylinder to move to said first axial position when said key is withdrawn, thereby permitting said lock member to lock said steering shaft.

2. A steering lock device according to claim 1, wherein said block member includes an engaging member formed on a rear portion of said inner cylinder to engage with said slider when said inner cylinder is in said second axial position.

3. A steering lock device according to claim 1, wherein:
    said key lever has up and down operating positions responsive to insertion and removal of said key; and said outer cylinder has a groove in an inner periphery thereof;

said up operating position is effective to protrude a portion of said key lever to engage said groove.

4. A steering lock device according to claim 1, wherein:

said key lever has a pin in a top end thereof; and means for biasing said pin into said up position.

5. A steering lock device for a vehicle according to claim 1, wherein:

said regulating member includes a pin incorporated in said top end of said key lever;

a groove is disposed along an inner periphery of said outer cylinder; and means for biasing said pin into said groove, thereby allowing said pin to engage said groove when said inner cylinder is rotated to said second rotation position.

6. A steering lock device for a vehicle according to claim 1, wherein:

said regulating member includes a movable pin provided in said inner cylinder;

a groove is disposed along an inner periphery of said outer cylinder; and means for biasing said pin into said groove thereby allowing said pin to engage said groove when said inner cylinder is rotated to said second rotation position.

7. A steering lock device according to claim 1, wherein:

said regulating member includes a movable pin provided in said outer cylinder;

a groove is disposed along an outer periphery of said inner cylinder; and means for biasing said pin into said groove, thereby allowing said pin to engage said groove when said inner cylinder is rotated to said second rotation position.

8. A steering lock device according to claim 1, wherein said regulating member includes:

a cam having a protrusion, formed in a rear portion of said inner cylinder; and an engaging face formed in said slider, thereby allowing said protrusion of said cam to engage said engaging face of said slider when said inner cylinder is rotated to said second rotation position.

* * * * *